(12) United States Patent
Chanoch et al.

(10) Patent No.: US 9,298,911 B2
(45) Date of Patent: Mar. 29, 2016

(54) METHOD, APPARATUS, SYSTEM, AND COMPUTER READABLE MEDIUM FOR PROVIDING APPARATUS SECURITY

(71) Applicant: Intel Corporation, Santa Clara, CA (US)

(72) Inventors: Gal Chanoch, Haifa (IL); Eran Birk, Haifa (IL); Baiju Patel, Portland, OR (US); Steven Grobman, El Dorado Hills, CA (US); Tobias Kohlenberg, Portland, OR (US); Rajeev Gopalakrisha, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 68 days.

(21) Appl. No.: 13/840,799

(22) Filed: Mar. 15, 2013

(65) Prior Publication Data

US 2014/0282832 A1    Sep. 18, 2014

(51) Int. Cl.
| | |
|---|---|
| *H04L 29/06* | (2006.01) |
| *G06F 21/54* | (2013.01) |
| *G06F 11/00* | (2006.01) |
| *G06F 12/14* | (2006.01) |
| *G06F 12/16* | (2006.01) |

(52) U.S. Cl.
CPC ..................................... *G06F 21/54* (2013.01)

(58) Field of Classification Search
None
See application file for complete search history.

(56) References Cited

U.S. PATENT DOCUMENTS

| | | | |
|---|---|---|---|
| 7,962,961 B1 | 6/2011 | Griffin et al. | |
| 8,359,655 B1 * | 1/2013 | Pham | G06F 21/12 370/486 |
| 8,713,631 B1 * | 4/2014 | Pavlyushchik | G06F 21/566 726/1 |
| 2001/0013118 A1 * | 8/2001 | Krishnaswamy | G06F 9/542 717/141 |
| 2003/0226022 A1 * | 12/2003 | Schmidt | G06F 21/53 713/189 |
| 2004/0139346 A1 | 7/2004 | Watt et al. | |
| 2004/0153672 A1 * | 8/2004 | Watt | G06F 9/3012 726/22 |

(Continued)

FOREIGN PATENT DOCUMENTS

WO    WO 2014/150236    9/2014

OTHER PUBLICATIONS

PCT International Search Report and Written Opinion in PCT Application Serial No. PCT/US2014/022667 mailed on Jul. 3, 2014 (11 pages).

(Continued)

*Primary Examiner* — Dede Zecher
*Assistant Examiner* — Trang Doan
(74) *Attorney, Agent, or Firm* — Patent Capital Group

(57) ABSTRACT

Technologies are provided in embodiments for receiving policy information associated with at least one security exception, the security exception relating to execution of at least one program, determining an operation associated with the security exception based, at least in part, on the policy information, and causing the operation to be performed, based at least in part, on a determination that the at least one security exception occurred.

25 Claims, 8 Drawing Sheets

(56) References Cited

U.S. PATENT DOCUMENTS

| | | | |
|---|---|---|---|
| 2005/0172126 A1* | 8/2005 | Lange | G06F 21/53 713/166 |
| 2005/0273605 A1* | 12/2005 | Saha | G06F 21/53 713/166 |
| 2006/0288420 A1* | 12/2006 | Mantripragada | G06F 21/51 726/25 |
| 2007/0226797 A1* | 9/2007 | Thompson | G06F 21/55 726/22 |
| 2007/0261124 A1* | 11/2007 | Centonze | G06F 21/6227 726/27 |
| 2007/0283146 A1* | 12/2007 | Neveux | G06F 21/74 713/166 |
| 2008/0282320 A1 | 11/2008 | DeNovo et al. | |
| 2009/0019316 A1* | 1/2009 | Buccella | G06F 11/008 714/47.1 |
| 2009/0320129 A1* | 12/2009 | Pan | G06F 21/54 726/22 |
| 2010/0333167 A1* | 12/2010 | Luo | H04L 63/20 726/1 |
| 2011/0016508 A1* | 1/2011 | Wallace | G06F 21/604 726/1 |
| 2011/0023118 A1* | 1/2011 | Wright | G06F 11/28 726/23 |
| 2011/0154503 A1* | 6/2011 | Stewart | G06F 21/125 726/26 |
| 2011/0185433 A1* | 7/2011 | Amarasinghe | G06F 21/53 726/25 |
| 2011/0225655 A1* | 9/2011 | Niemela | G06F 21/566 726/24 |
| 2011/0231936 A1* | 9/2011 | Williams | G06F 21/577 726/25 |
| 2013/0061284 A1* | 3/2013 | Berengoltz | G06F 21/51 726/1 |
| 2013/0067532 A1* | 3/2013 | Deakin | G06F 21/54 726/1 |
| 2013/0097662 A1* | 4/2013 | Pearcy | G06F 21/577 726/1 |
| 2013/0212700 A1* | 8/2013 | Grocutt | G06F 21/606 726/27 |
| 2014/0115702 A1* | 4/2014 | Li | G06F 11/30 726/23 |

OTHER PUBLICATIONS

PCT International Preliminary Report on Patentability in PCT International Application Serial No. PCT/US2014/022667 mailed on Sep. 15, 2015 (8 pages).

* cited by examiner

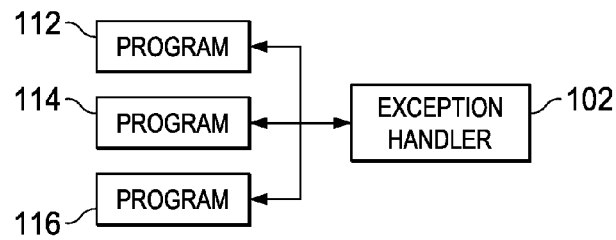
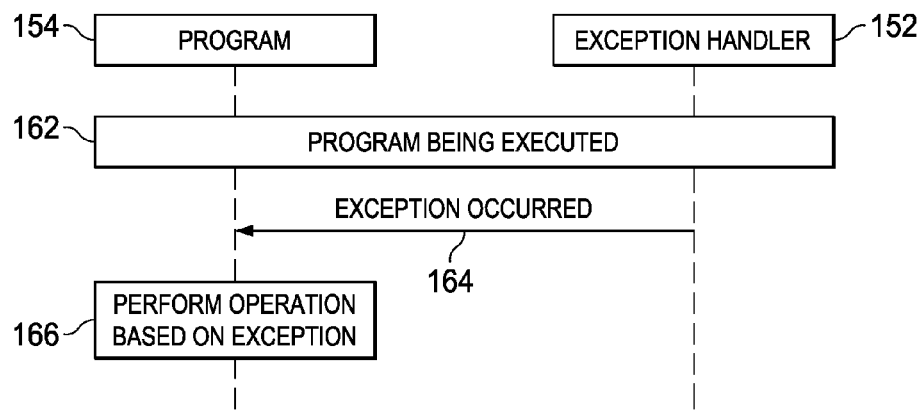
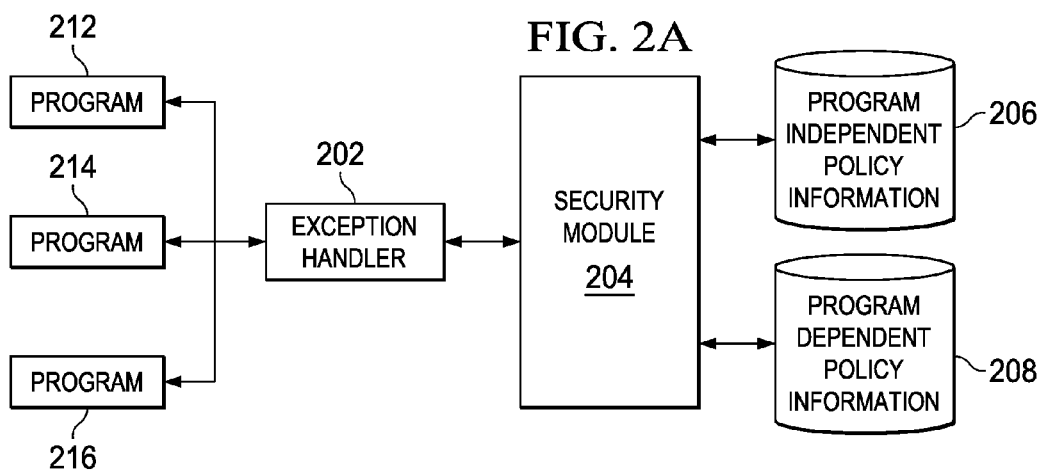

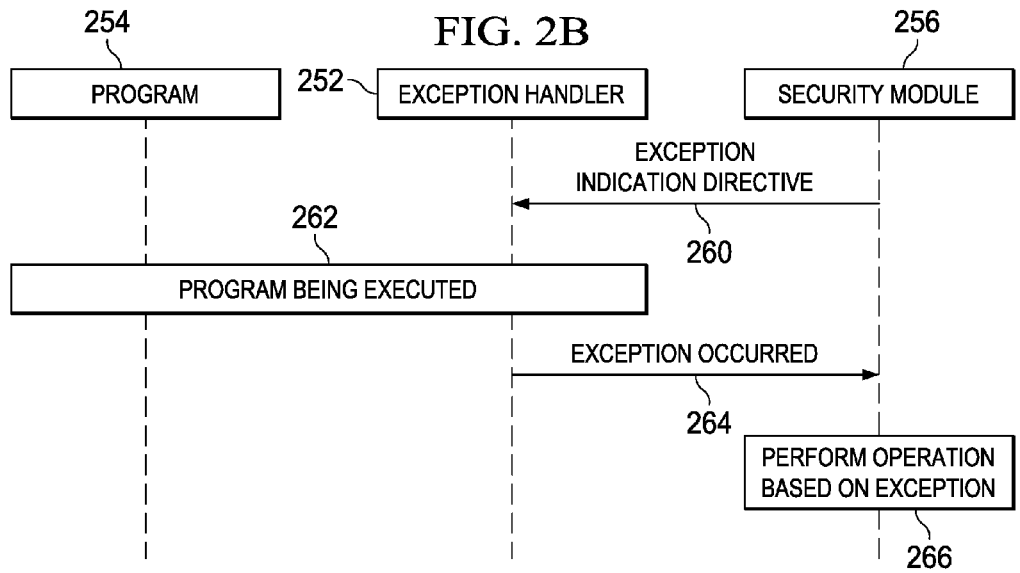
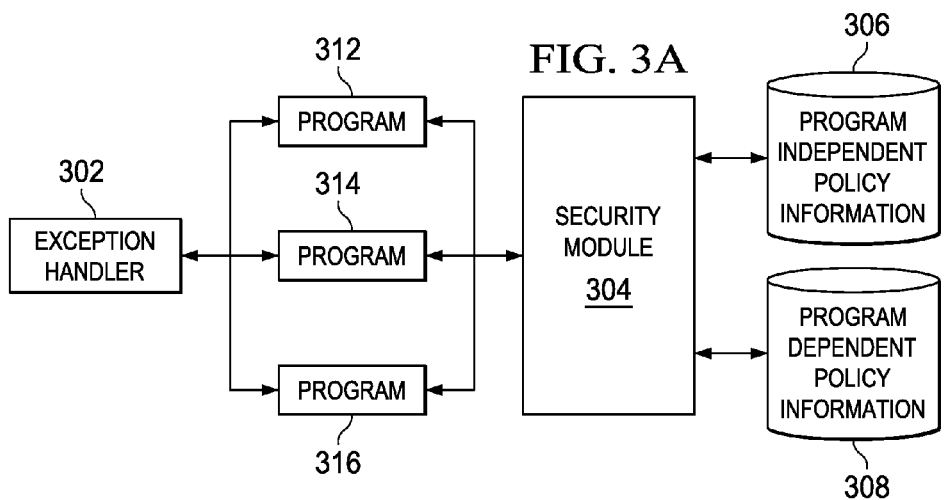

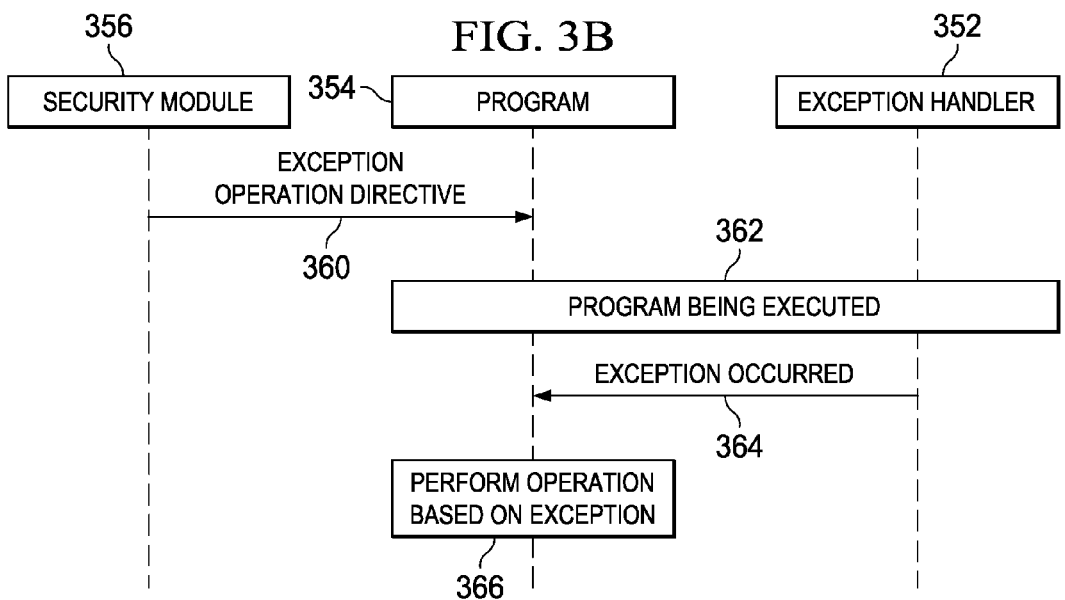
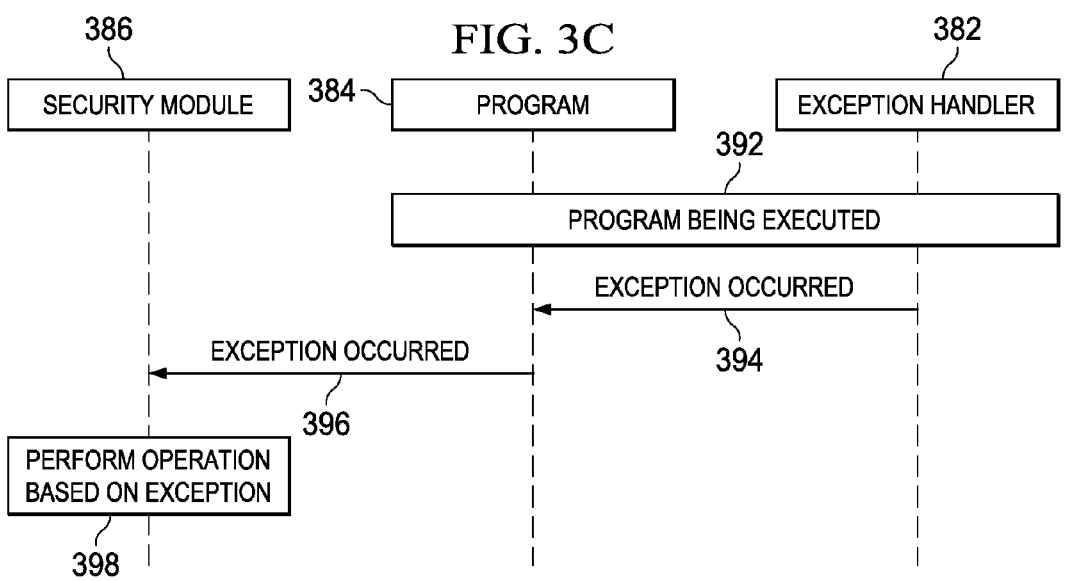

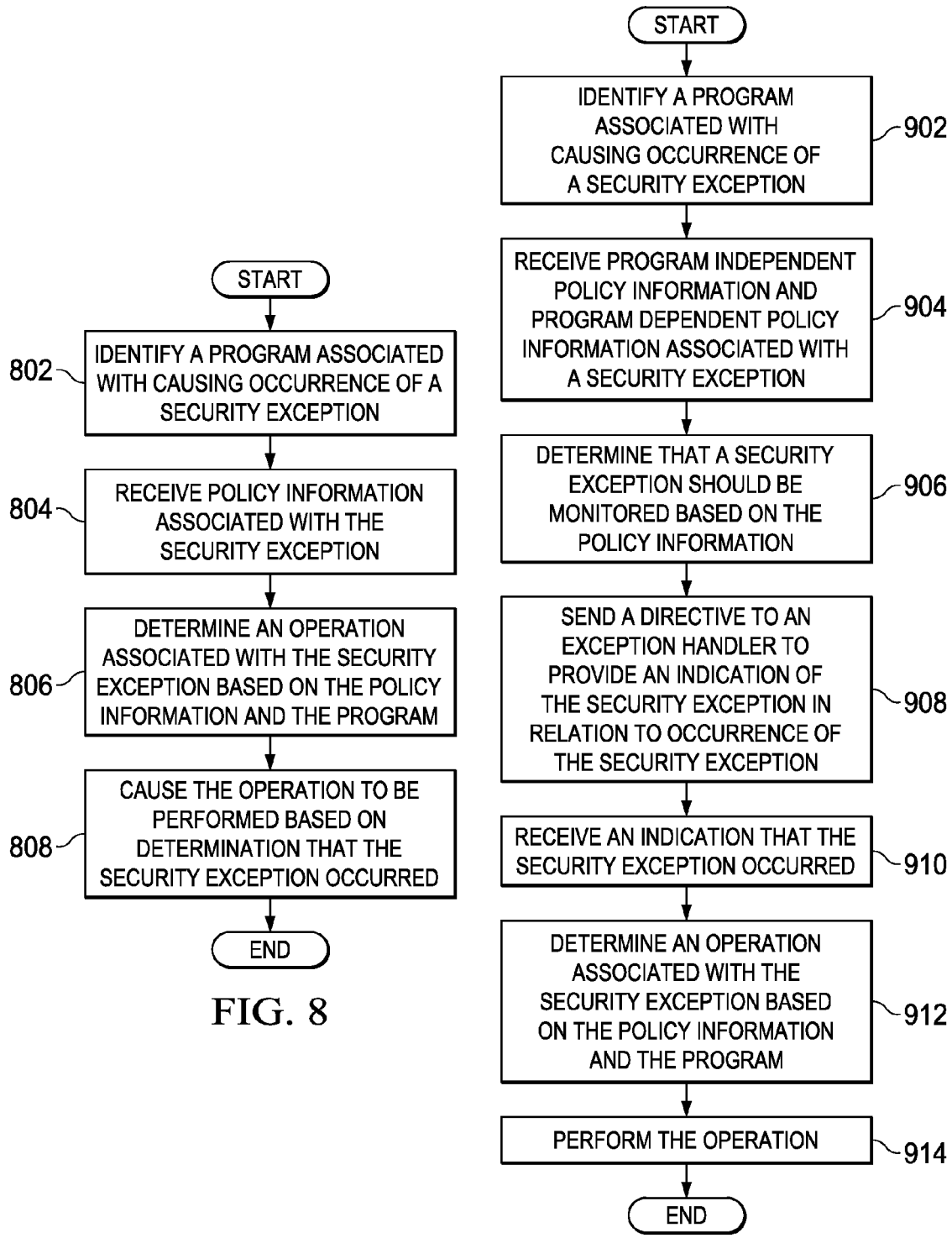

METHOD, APPARATUS, SYSTEM, AND COMPUTER READABLE MEDIUM FOR PROVIDING APPARATUS SECURITY

TECHNICAL FIELD

This disclosure relates in general to the field of electronic apparatus security and, more particularly, to security exceptions.

BACKGROUND

The field of apparatus security has become increasingly important in today's society. The Internet has enabled interconnection of different computer networks all over the world. However, the Internet has also presented many opportunities for malicious actors to exploit these networks to negatively impact an apparatus. Certain types of malicious software (e.g., bots) can be configured to receive commands from a remote operator once the software has infected a host computer. The software can be instructed to perform any number of malicious actions, such as sending out spam or malicious emails from the host computer, stealing sensitive information from a business or individual associated with the host computer, propagating to other host computers, and/or assisting with distributed denial of service attacks. In addition, the malicious actor can sell or otherwise give access to other malicious actors, thereby escalating the exploitation of the host computers. Thus, the ability to effectively protect and maintain stable computers and systems continues to present significant challenges for component manufacturers, system designers, and network operators.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 1A is a block diagram illustrating components associated with a security exception according to at least one embodiment;

FIG. 1B is an interaction diagram illustrating interaction associated with a security exception according to at least one embodiment;

FIG. 2A is another block diagram illustrating components associated with a security exception according to at least one embodiment;

FIG. 2B is another interaction diagram illustrating interaction associated with a security exception according to at least one embodiment;

FIG. 3A is still another block diagram illustrating components associated with a security exception according to at least one embodiment;

FIG. 3B is still another interaction diagram illustrating interaction associated with a security exception according to at least one embodiment;

FIG. 3C is yet another interaction diagram illustrating interaction associated with a security exception according to at least one embodiment;

FIG. 8 is even another flow diagram illustrating activities associated with providing apparatus security according to at least one embodiment;

FIG. 9 is yet still another flow diagram illustrating activities associated with providing apparatus security according to at least one embodiment;

DETAILED DESCRIPTION OF EMBODIMENTS

FIG. 1A is a block diagram illustrating components associated with a security exception according to at least one embodiment. The example of FIG. 1A is merely an example of components associated with a security exception, and does not limit the scope of the claims. For example, operations attributed to a component may vary, number of components may vary, composition of a component may vary, and/or the like. For example, in some embodiments, operations attributable to one component of the example of FIG. 1A may be allocated to one or more other components.

Figure 11:
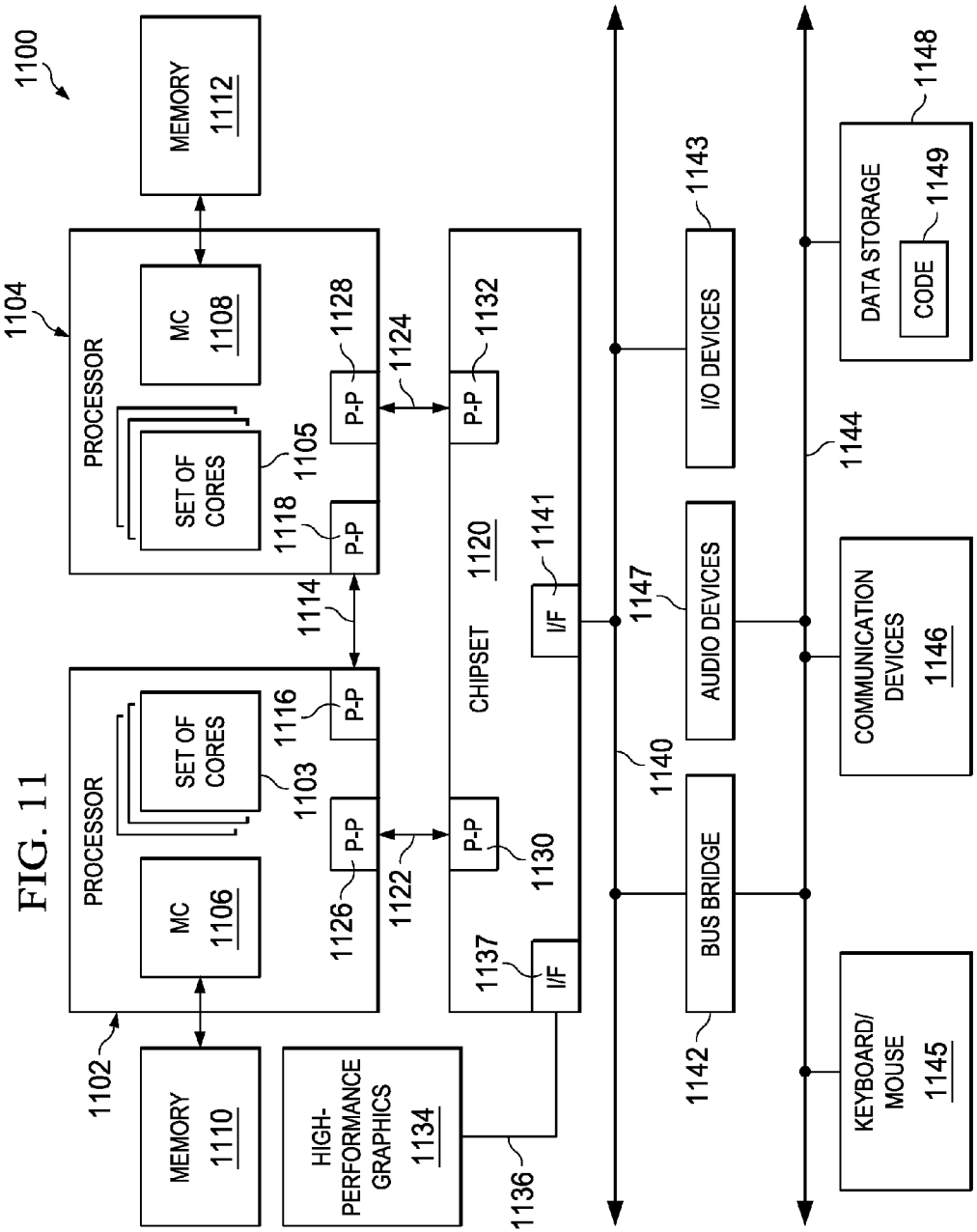
FIG. 11 is a block diagram showing a computing system that is arranged in a point-to-point (PtP) configuration according to an embodiment.

As apparatus security becomes a greater concern, apparatuses, such as computing system 1100 of FIG. 11, have begun incorporating hardware that can detect operational patterns that may indicate a security threat. For example, the instruction set architecture of a processor may support hardware capabilities to detect security violations.

In at least one embodiment, the apparatus may have the capability to detect an out of bounds memory access, such as a buffer overrun. An out of bounds memory access may be indicative of an attack on an apparatus that involves overwriting a variable to change the behavior of a program, overwriting a return address in a stack frame, overwriting a function pointer, and/or the like.

In at least one embodiment, the apparatus may have the capability to detect an attempt to execute an instruction that is stored in a memory region that is designated for non-executable information. For example, such memory may be designated by an execute disable bit (XD bit), an enhanced virus protection designation, an execute never (XN) designation, and/or the like. Execution of an instruction that is stored in a region that is designated for non-executable information may be indicative of an attack that involves executing instructions that have been maliciously placed within a region of memory designated for information.

In at least one embodiment, the apparatus may have the capability to detect a supervisory mode execution protection (SMEP) violation. Such a violation may relate to an attack that involves a program performing operations that exceed the privilege level associated with the program, such as modifying a memory cache.

Although specific examples of detection capabilities have been discussed, it should be understood that these capabilities are merely examples, and that any combination of detection capabilities may be applicable, and do not limit the scope of the claims.

In at least one embodiment, detection of an operational pattern that may indicate a security threat may be communicated by way of a security exception. In at least one embodiment, a security exception relates to an exception that is associated with detection of an operational pattern that may indicate a security threat. In at least one embodiment, an exception relates to an event that is triggered by an anomalous or exceptional situation associated with the execution of one or more instructions. In some circumstances, such anomalous or exceptional situation may be associated with special processing to address the exceptional or anomalous situation.

In the example of FIG. 1A, exception handler 102 receives an indication that a security exception has occurred. The indication may be a signal, a message, an interrupt, and/or the like. The indication may provide security exception information. In at least one embodiment, security exception information may indicate the type of security exception that occurred, instruction information associated with the security exception that occurred, an indication of one or more programs associated with the security exception, and/or the like. In at least one embodiment, a security exception may be related to execution of at least one program by way of occurrence of the security exception in association with execution of an instruction associated with the at least one program. For example, the security exception may relate to a program because the instruction that caused the security exception was an instruction of the program.

In the example of FIG. 1A, exception handler 102 is in communication with programs 112, 114, and 116. Programs 112, 114, and 116 may be any program, such as an application, an operating system, a device driver, and/or the like.

FIG. 1B is an interaction diagram illustrating interaction associated with a security exception according to at least one embodiment. The example of FIG. 1B is merely an example of interaction, and does not limit the scope of the claims. For example, number of modules may vary, specific interactions may vary, order of interactions may vary, and/or the like.

The example of FIG. 1B illustrates an example of interaction between an exception handler 152 and a program 154. Block 162 indicates that program 154 is being executed. In the example of FIG. 1B, a security exception occurs in relation to execution of program 154. Therefore, program 154 may be referred to as a program associated with causing occurrence of the security exception. At interaction 164, the exception handler provides an indication that the security exception occurred. In at least one embodiment, at block 166, the program performs an operation based, at least in part, on the security exception. In at least one embodiment, the operation may relate to propagation of the security exception to another program. For example, the program may propagate the security exception to an operating system. In such an example, the program may forgo resolution of the circumstances associated with the security exception and allow the operating system to resolve the circumstances associated with the security exception. In such an example, the operating system may terminate execution of the program. In at least one embodiment, the operation may relate to termination of propagation of the security exception to any other program. For example, the program may perform an operation associated with trapping the security exception, catching the security exception, and/or the like.

FIG. 2A is another block diagram illustrating components associated with a security exception according to at least one embodiment. The example of FIG. 2A is merely an example of components associated with a security exception, and does not limit the scope of the claims. For example, operations attributed to a component may vary, number of components may vary, composition of a component may vary, and/or the like. For example, in some embodiments, operations attributable to one component of the example of FIG. 2A may be allocated to one or more other components.

It may be desirable to allow a security module to perform actions when a security exception occurs, instead of relying on the program itself to perform the actions. For example, the exception handler may receive an indication that a security exception occurred. In such circumstances, the exception handler may send information associated with the security exception to the security module instead of the program. Without limiting the claims in any way, at least one technical advantage of such interaction is that programs do not need to comprise instructions for reacting to such security exceptions. Therefore, such an advantage allows for more simple programs that may rely on services provided by a security module without the added complexity associated with the activities that the security module performs. Therefore, since there are often multiple programs loaded on and/or being executed by an apparatus, at least one technical advantage is reduced memory consumption associated with programs. At least one additional technical advantage is being able to perform actions associated with a security exception without reliance on the propriety of the program that caused the security exception. For example, if the program that caused the security exception is a malicious program, the security module may perform activities associated with the security exception without the malicious program being able to countermand any corrective activities.

The example of FIG. 2A shows security module 204 in communication with exception handler 202, repository 206, which comprises program independent policy information, and repository 208, which comprises program dependent policy information. Exception handler 202 is in communication with programs 212, 214, and 216.

Program independent policy information and program dependent policy information may be generally referred to as policy information. For example policy information may comprise program independent policy information and/or program dependent policy information. Even though the example of FIG. 2A illustrates 2 repositories for program independent policy information and program dependent policy information, repository allocation associated with policy information may vary. For example, at least part of the program independent policy information may be allocated to the same repository as at least part of program independent policy information. In another example, at least part of the program dependent policy information may be allocated to a different repository than another part of the program dependent policy information. In still another example, at least part of the program independent policy information may be allocated to a different repository than another part of the program independent policy information. Furthermore, in at least one embodiment, the policy information is absent program independent policy information. In addition, in at least one embodiment, the policy information is absent program dependent policy information.

Program dependent policy information relates to policy information that is associated with an aspect of a program, such as identity of the program, identity of the source of the program, an operational characteristic of the program, and/or the like. Identity of the source of the program may comprise identity of a development entity, such as a developer, an author, a publisher, a distributor, and/or the like. Policy information associated with an aspect of the program may relate to an interface manipulation rating, such as an assessment of how many external interfaces exist and/or how accessible the code paths are to manipulation by data passed into the interfaces. For example, a complex part of a program which only receives a single integer as a parameter may have a low risk rating. Policy information associated with an aspect of the program may relate to a code quality rating. For example, poorly written code or code which had limited security assurance may indicate a greater security risk, and therefore, relate to a high risk rating. Policy information associated with an attribute of the program may relate to performance sensitivity. Performance sensitivity may relate to how sensitive the program is to degradation in performance. For example, if rigorous application of security checking regarding the program is detrimental to the desired operation of the program, such program may have a low risk rating associated with performance sensitivity. Policy information associated with a development entity may relate to a measured reputation of the development entity. For example, a development entity with a known record of secure performance may have a lower risk rating than an unknown development entity. Policy information associated with identity of the program may relate to known risks associated with the program itself. For example, if a specific security problem is known regarding the program, the risk rating associated with that area of security may be high.

Program independent policy information relates to policy information that is unassociated with a program. For example program independent policy information may comprise information relating to an operating environment of the apparatus. For example, if a portion of an operating environment, such as a region of memory, is not used by any program having security importance, security risk of a security exception in relation to that portion of the operating environment may be low. Conversely, if the security exception is in relation to a portion of the operating environment that has security importance, such as a call stack, security risk of a security exception in relation to that portion of the operating environment may be high. In another example, the program independent policy information may comprise general information regarding security exceptions. For example, the policy information may relate a class of security exception to a low security risk.

Security module 204 may evaluate policy information to determine an operation to perform when a security exception occurs. For example, the operation determined may be proportional to the risk level associated with the security exception in view of the policy information. For example, if the policy information indicates that a security exception is a high risk, the operation may relate to an action to avoid a possible threat represented by the security exception, such as terminating the program. In another example, if the policy information indicates that a security exception is a low risk and/or benign, the operation may relate to terminating propagation of the security exception, and allowing the program to continue operation as if the security exception did not occur.

FIG. 2B is an interaction diagram illustrating interaction associated with a security exception according to at least one embodiment. The example of FIG. 2B is merely an example of interaction, and does not limit the scope of the claims. For example, number of modules may vary, specific interactions may vary, order of interactions may vary, and/or the like.

The example of FIG. 2B shows interaction between security module 256, exception handler 252, and program 254. In the example of FIG. 2B, security module 256 sends a directive to exception handler 252. In at least one embodiment, the directive relates to a directive to provide an indication that a security exception occurs. The directive may specify one or more security exceptions to be indicated. For example, the directive may be a directive to provide indication of a buffer overrun security exception. The directive may be a directive to provide the indication in relation to occurrence of the security exception. For example, the directive may induce sending of the indication when the security exception is received, trapped, caught, and/or the like. For example, the sending of the indication may be causally dependent upon the occurrence of the security exception. In such an example, the directive may be a directive that the security exception causes the indication to be sent to security module 256.

Block 262 indicates that program 254 is being executed. Even though block 262 is shown after interaction 260, it should be understood that interaction 260 may be during block 262 or after block 262. In the example of FIG. 2B, exception handler 252 sends an indication that the security exception occurred at interaction 264. Security module 256 receives the indication that at least one security exception occurred from exception handler 252.

In at least one embodiment, the security module determines an operation to perform based, at least in part, on occurrence of the security exception and policy information. The operation may relate to termination of a program that caused the exception, sending of an indication of the exception to the program that caused the exception, termination of propagation of the exception, sending information associated with the exception to a server, causing modification of, at least a portion of, the policy information. In at least one embodiment, security module 256 may determine that it may be more appropriate for the program to take action regarding the security exception. For example, security module may determine that a security risk posed by the security exception is acceptable, but that the program may be able to take appropriate action. In such an example, the operation may be sending an indication that the security exception occurred to the program. In at least one embodiment, the operation may comprise sending information associated with the security exception to a server. For example, there may be an external server that tracks security exception activities in relation to the apparatus, the program, a user, a set of users, and/or the like. For example, the server may be aggregating information associated with security exceptions for the purpose of developing policy information, notifying software developers of security exceptions caused by their programs, etc. In another example, the operation may relate to causing modification of, at least a portion of the policy information. For example, the policy information may indicate that a certain security exception is expected to be a rare occurrence and a low security risk. However, if the certain security exception has been occurring often, the operation may cause modification of, at least a portion of the policy information, such as the portion associated with the security exception being a rare occurrence. In at least one embodiment, security module 256 identifies at least one program associated with causing occurrence of the at least one security exception. The program may be identified based on information communicated in association with the security exception. In at least one embodiment, determination of the operation is based, at least in part, on the identity of the program. For example, the identity of the program may correspond to program dependent policy information. In such an example, the operation may be based, at least in part, on the program dependent policy information.

At block 266, the apparatus performs the operation based on the exception. For example, occurrence of the security exception may cause the performance of the operation. For example, receiving of the indication that the security exception occurred may cause security module 256 to perform the operation. The security module may determine that the security exception occurred based on receipt of the indication that the security exception occurred. In the example of FIG. 2B, security module 256 causes the operation to be performed by performing the operation.

In at least one embodiment, interaction 260 may be based on a determination that a security exception should be monitored. Determining that the security exception should be monitored may relate to a determination, based, at least in part, on the policy information, that there may be a risk associated with the security exception that warrants any possible performance impact associated with monitoring for the security exception. For example, the policy information may indicate that there is a low performance impact associated with monitoring for the security exception. Under such circumstances, security module 256 may determine that the security exception should be monitored. In another example, the policy information may indicate that there is a high performance impact associated with monitoring for the security exception. Under such circumstances, security module 256 may determine that the security exception should not be monitored. Security module 256 may predicate sending of the directive of interaction 260 upon determination that the security exception should be monitored. For example, the security module may cause monitoring of the security exception by sending the directive of interaction 260. The directive of interaction 260 may instruct the exception handler to provide an indication that the security exception occurred by way of a callback function, a message, and/or the like.

FIG. 3A is still another block diagram illustrating components associated with a security exception according to at least one embodiment. The example of FIG. 3A is merely an example of components associated with a security exception, and does not limit the scope of the claims. For example, operations attributed to a component may vary, number of components may vary, composition of a component may vary, and/or the like. For example, in some embodiments, operations attributable to one component of the example of FIG. 3A may be allocated to one or more other components.

It may be desirable to allow a program to interact with a security module when the program received a security exception. For example, the program may receive an indication that a security exception occurred. In such circumstances, the program may send information associated with the security exception to the security module. In another example, the program may receive a directive to perform a specified operation upon receiving an indication that the security exception occurred. Without limiting the claims in any way, at least one technical advantage of such interaction is that programs do not need to comprise instructions for reacting to such security exceptions. Therefore, such an advantage allows for more simple programs that may rely on services provided by a security module without the added complexity associated with the activities that the security module performs. Therefore, since there are often multiple programs loaded on and/or being executed on an apparatus, at least one technical advantage is reduced memory consumption associated with programs.

The example of FIG. 3A shows security module 304 in communication with repository 306, which comprises program independent policy information, repository 308, which comprises program dependent policy information, and programs 312, 314, and 316. Exception handler 302 is in communication with programs 312, 314, and 316.

FIG. 3B is an interaction diagram illustrating interaction associated with a security exception according to at least one embodiment. The example of FIG. 3B is merely an example of interaction, and does not limit the scope of the claims. For example, number of modules may vary, specific interactions may vary, order of interactions may vary, and/or the like.

In at least one embodiment, a program may perform an operation designated by a security module based, at least in part, on occurrence of a security exception. Therefore, the security module may cause the operation to be performed, based, at least in part, on determination that the at least one security exception occurred by sending, to the program, a directive instructing the program to perform the operation based, at least in part, on occurrence of the at least one security exception. For example, the directive may designate an operation for the program to perform when the program receives an indication that a security exception has occurred.

In an embodiment, security module 356 may determine an operation to perform based, at least in part, on occurrence of at least one security exception similar as described regarding FIGS. 1A-2B. Upon such determination, security module 356 may send a directive instructing program 354 to perform the operation based, at least in part, on program 354 determining that the security exception has occurred.

Block 362 indicates that program 354 is being executed. Even though block 362 is shown after interaction 360, it should be understood that interaction 360 may be during block 362 or after block 362. In the example of FIG. 3B, exception handler 352 sends an indication that the security exception occurred at interaction 364. Program 354 receives the indication that at least one security exception occurred from exception handler 352. Upon receiving the indication that the exception occurred, at block 366 program 354 performs the operation designated by security module 356. Therefore, by sending the directive to program 354, Security module 356 has caused the operation to be performed, based at least in part, on determination that the at least one security exception occurred. In at least one embodiment, even though not shown in FIG. 3B, security module 356 may send a directive to exception handler 352 instructing exception handler 352 to provide an indication that the at least one security exception occurred in relation to occurrence of the security exception, similar as described regarding FIG. 2B. The operation of block 366 may be similar as described regarding FIGS. 1A-2B.

FIG. 3C is an interaction diagram illustrating interaction associated with a security exception according to at least one embodiment. The example of FIG. 3C is merely an example of interaction, and does not limit the scope of the claims. For example, number of modules may vary, specific interactions may vary, order of interactions may vary, and/or the like.

In at least one embodiment, a program 384 may receive an indication from an exception handler 382 indicating that a security exception has occurred, and program 384 may send an indication to a security module 386 indicating that the security exception occurred. Upon receiving the indication, security module 386 may cause an operation to be performed, based, at least in part, on the received indication. For example, security module 386 may determine that the security exception occurred based, at least in part, on the receipt of the indication.

Block 392 indicates that program 384 is being executed. In the example of FIG. 3B, exception handler 382 sends an indication that the security exception occurred at interaction 394. Program 384 receives the indication that at least one security exception occurred from exception handler 382. Upon receiving the indication that the exception occurred, program 384 sends an indication that the security exception occurred at interaction 396. Security module 386 receives the indication that at least one security exception occurred from program 384. Upon receiving the indication that the exception occurred, security module 386 causes an operation to be performed at block 398. In at least one embodiment, even though not shown in FIG. 3C, security module 386 may send a directive to exception handler 382 instructing exception handler 382 to provide an indication that the at least one security exception occurred in relation to occurrence of the security exception, similar as described regarding FIG. 2B. The operation of block 398 may be similar as described regarding FIGS. 1A-2B.

In an embodiment, security module 386 may determine an operation to perform based, at least in part, on occurrence of at least one security exception similar as described regarding FIGS. 1A-2B. Upon such determination, security module 356 may perform the operation based, at least in part, on receiving the indication from program 384 at interaction 396.

Figure 4:
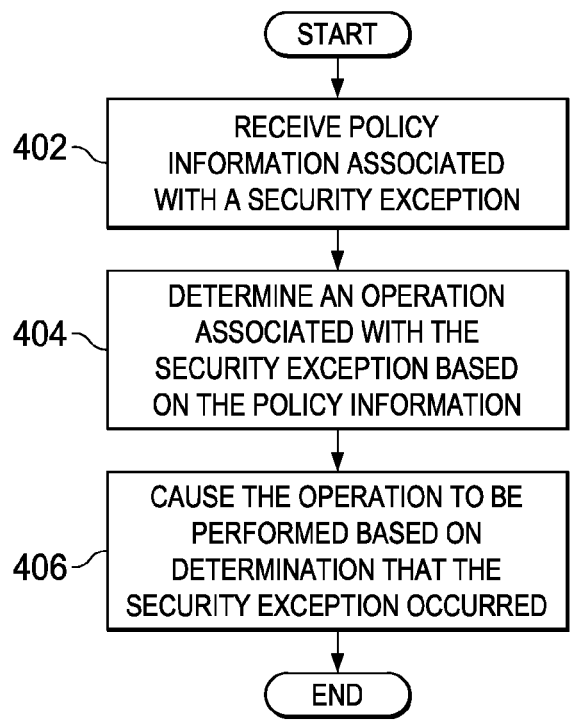
FIG. 4 is a flow diagram illustrating activities associated with providing apparatus security according to at least one embodiment.

FIG. 4 is a flow diagram illustrating activities associated with providing apparatus security according to at least one embodiment. In at least one embodiment, there is a set of operations that corresponds to the activities of FIG. 4. An apparatus, for example computing system 1100 of FIG. 11, or a portion thereof, may utilize the set of operations. The apparatus may comprise means, including, for example processor 1000 of FIG. 10, for performing such operations. In an embodiment, an apparatus, for example computing system 1100 of FIG. 11, is transformed by having memory, for example memory 1110 of FIG. 11, comprising computer code configured to, working with a processor, for example processor 1102 of FIG. 11, cause the apparatus to perform set of operations of FIG. 4.

At block 402, the apparatus receives policy information associated with at least one security exception. In at least one embodiment, the security exception relates to execution of at least one program. The receiving and the policy information may be similar as described regarding FIGS. 2A-3C. the security exception may be similar as described regarding FIGS. 1A-3C.

At block 404, the apparatus determines an operation associated with the security exception based, at least in part, on the policy information. In at least one embodiment, the operation may be further based, at least in part, on the security exception, similar as described regarding FIGS. 2A-2B. The operation and determination of the operation may be similar as described regarding FIGS. 2A-3C.

At block 406, the apparatus causes the operation to be performed, based at least in part, on determination that the at least one security exception occurred, similar as described regarding FIGS. 2A-3C.

Figure 5:
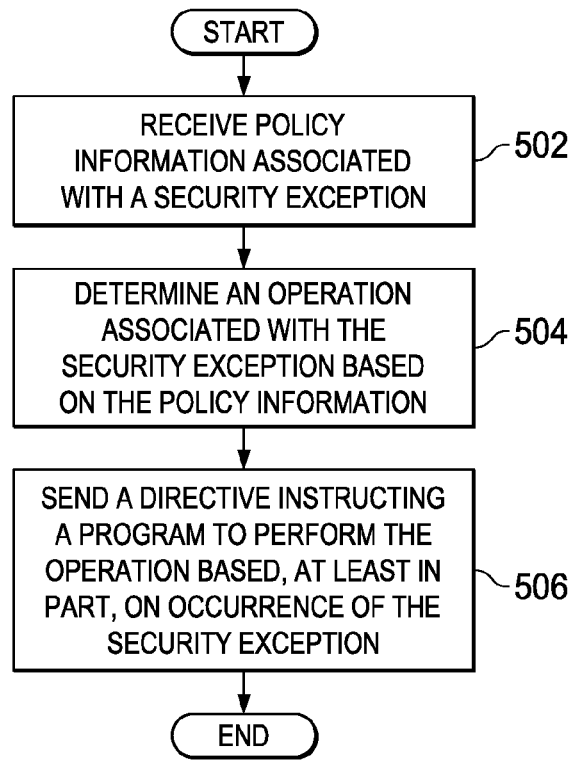
FIG. 5 is another flow diagram illustrating activities associated with providing apparatus security according to at least one embodiment.

FIG. 5 is a flow diagram illustrating activities associated with providing apparatus security according to at least one embodiment. In at least one embodiment, there is a set of operations that corresponds to the activities of FIG. 5. An apparatus, for example computing system 1100 of FIG. 11, or a portion thereof, may utilize the set of operations. The apparatus may comprise means, including, for example processor 1000 of FIG. 10, for performing such operations. In an embodiment, an apparatus, for example computing system 1100 of FIG. 11, is transformed by having memory, for example memory 1110 of FIG. 11, comprising computer code configured to, working with a processor, for example processor 1102 of FIG. 11, cause the apparatus to perform set of operations of FIG. 5.

At block 502, the apparatus receives policy information associated with at least one security exception similar as described regarding block 402 of FIG. 4. At block 504, the apparatus determines an operation associated with the security exception based, at least in part, on the policy information, similar as described regarding block 404 of FIG. 4. At block 506, the apparatus sends, to the at least one program, a directive instructing the program to perform the operation based, at least in part, on occurrence of the at least one security exception, similar as described regarding FIGS. 3A-3B.

Figure 6:
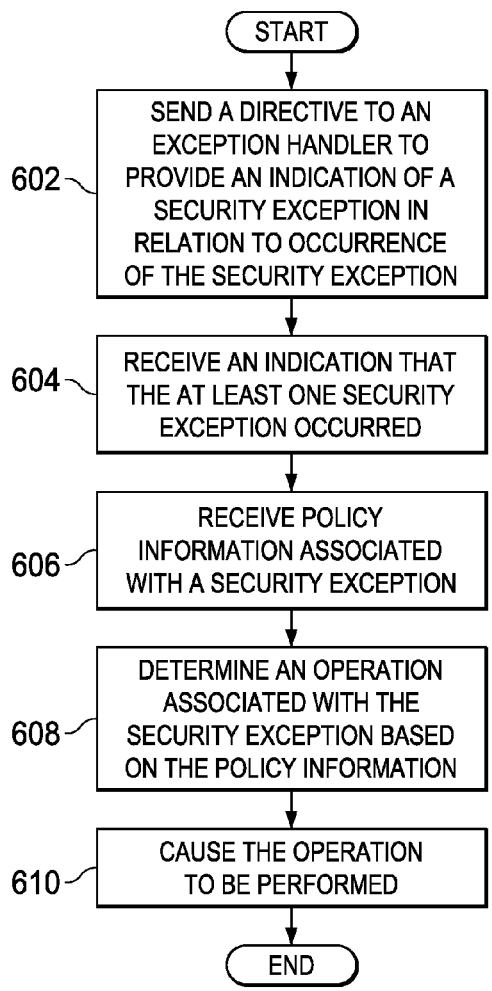
FIG. 6 is still another flow diagram illustrating activities associated with providing apparatus security according to at least one embodiment.

FIG. 6 is a flow diagram illustrating activities associated with providing apparatus security according to at least one embodiment. In at least one embodiment, there is a set of operations that corresponds to the activities of FIG. 6. An apparatus, for example computing system 1100 of FIG. 11, or a portion thereof, may utilize the set of operations. The apparatus may comprise means, including, for example processor 1000 of FIG. 10, for performing such operations. In an embodiment, an apparatus, for example computing system 1100 of FIG. 11, is transformed by having memory, for example memory 1110 of FIG. 11, comprising computer code configured to, working with a processor, for example processor 1102 of FIG. 11, cause the apparatus to perform set of operations of FIG. 6.

At block 602, the apparatus sends a directive to provide an indication that the at least one security exception occurred in relation to occurrence of the security exception similar as described regarding FIGS. 2A-3C. At block 604, the apparatus receives an indication that the at least one security exception occurred similar as described regarding FIGS. 2A, 2B, 3A, and 3C. At block 606, the apparatus receives policy information associated with at least one security exception similar as described regarding block 402 of FIG. 4. At block 608, the apparatus determines an operation associated with the security exception based, at least in part, on the policy information, similar as described regarding block 404 of FIG. 4. At block 610, the apparatus causes the operation to be performed, similar as described regarding FIGS. 2A, 2B, 3A, and 3C.

Figure 7:
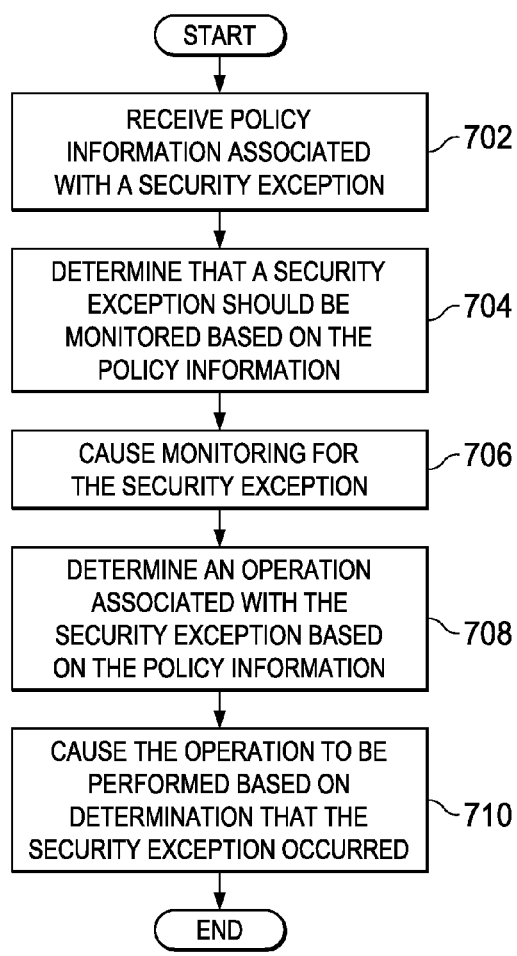
FIG. 7 is yet another flow diagram illustrating activities associated with providing apparatus security according to at least one embodiment.

FIG. 7 is a flow diagram illustrating activities associated with providing apparatus security according to at least one embodiment. In at least one embodiment, there is a set of operations that corresponds to the activities of FIG. 7. An apparatus, for example computing system 1100 of FIG. 11, or a portion thereof, may utilize the set of operations. The apparatus may comprise means, including, for example processor 1000 of FIG. 10, for performing such operations. In an embodiment, an apparatus, for example computing system 1100 of FIG. 11, is transformed by having memory, for example memory 1110 of FIG. 11, comprising computer code configured to, working with a processor, for example processor 1102 of FIG. 11, cause the apparatus to perform set of operations of FIG. 7.

At block 702, the apparatus receives policy information associated with at least one security exception similar as described regarding block 402 of FIG. 4. At block 704, the apparatus determines that the security exception should be monitored based, at least in part, on the policy information, similar as described regarding FIGS. 2A-3C. At block 706, the apparatus causes monitoring for the security exception based, at least in part, on the determination that the security exception should be monitored, similar as described regarding FIGS. 2A-3C. At block 708, the apparatus determines an operation associated with the security exception based, at least in part, on the policy information, similar as described regarding block 404 of FIG. 4. At block 710, the apparatus causes the operation to be performed, similar as described regarding block 406 of FIG. 4.

FIG. 8 is a flow diagram illustrating activities associated with providing apparatus security according to at least one embodiment. In at least one embodiment, there is a set of operations that corresponds to the activities of FIG. 8. An apparatus, for example computing system 1100 of FIG. 11, or a portion thereof, may utilize the set of operations. The apparatus may comprise means, including, for example processor 1000 of FIG. 10, for performing such operations. In an embodiment, an apparatus, for example computing system 1100 of FIG. 11, is transformed by having memory, for example memory 1110 of FIG. 11, comprising computer code configured to, working with a processor, for example processor 1102 of FIG. 11, cause the apparatus to perform set of operations of FIG. 8.

At block 802, the apparatus identifies at least one program associated with causing occurrence of the at least one security exception, similar as described regarding FIGS. 1A-3C. At block 804, the apparatus receives policy information associated with at least one security exception similar as described regarding block 402 of FIG. 4. At block 806, the apparatus determines an operation associated with the security exception based, at least in part, on the policy information and the identity of the program, similar as described regarding FIGS. 1A-3C. At block 808, the apparatus causes the operation to be performed, similar as described regarding FIGS. 1A-3C.

FIG. 9 is a flow diagram illustrating activities associated with providing apparatus security according to at least one embodiment. In at least one embodiment, there is a set of operations that corresponds to the activities of FIG. 9. An apparatus, for example computing system 1100 of FIG. 11, or a portion thereof, may utilize the set of operations. The apparatus may comprise means, including, for example processor 1000 of FIG. 10, for performing such operations. In an embodiment, an apparatus, for example computing system 1100 of FIG. 11, is transformed by having memory, for example memory 1110 of FIG. 11, comprising computer code configured to, working with a processor, for example processor 1102 of FIG. 11, cause the apparatus to perform set of operations of FIG. 9.

At block 902, the apparatus identifies at least one program associated with causing occurrence of the at least one security exception, similar as described regarding block 802 of FIG. 8. At block 904, the apparatus receives program independent policy information and program dependent policy information. In at least one embodiment, the program dependent policy information is associated with the at least one program. At block 906, the apparatus determines that the security exception should be monitored based, at least in part, on the policy information, similar as described regarding block 704 of FIG. 7. At block 908, the apparatus sends a directive to an exception handler to provide the indication, similar as described regarding FIGS. 2A-3C. At block 910, the apparatus receives an indication that the security exception occurred, similar as described regarding FIGS. 2A-3C. The apparatus may determine that the security exception occurred based, at least in part, on receiving the indication. At block 912, the apparatus determines an operation associated with the security exception based, at least in part, on the program independent policy information, the program dependent policy information and the identity of the at least one program, similar as described regarding blocks 2A-3C. At block 914, the apparatus performs the operation, similar as described regarding FIGS. 2A-3C.

Figure 10:
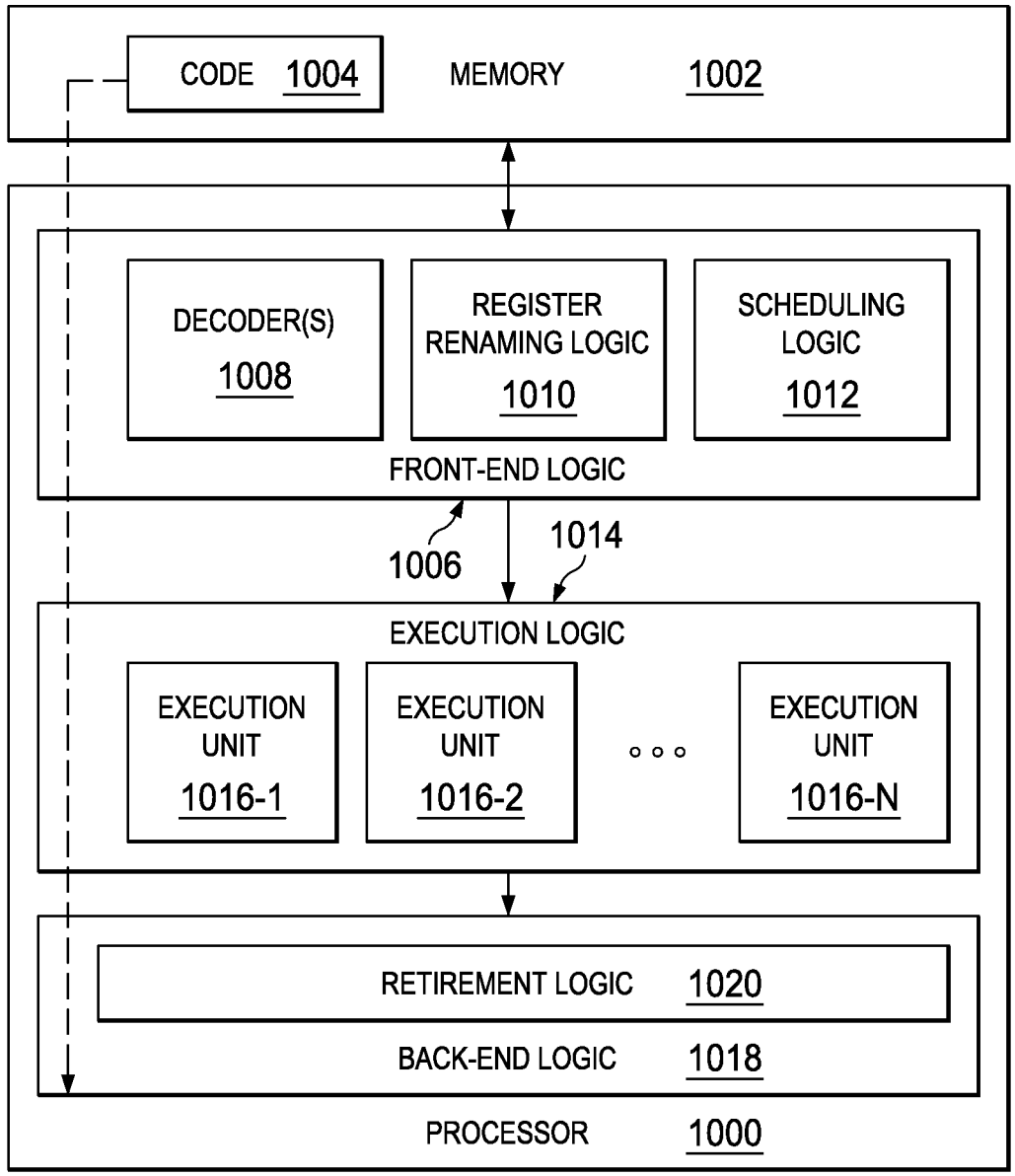
FIG. 10 is a block diagram showing a memory coupled to processor in accordance with an embodiment.

FIG. 10 illustrates a memory 1002 coupled to processor 1000 in accordance with at least one embodiment. Memory 1002 may be any of a wide variety of memories (including various layers of memory hierarchy). The memory 1002 may include code 1004, which may be one or more instructions, to be executed by processor 1000. Processor 1000 follows a program sequence of instructions indicated by code 1004. In at least one embodiment, an instruction enters a front-end logic 1006 and is processed by one or more decoders 1008. The decoder may generate a micro operation such as a fixed width micro operation in a predefined format, or may generate other instructions, microinstructions, control signals, and/or the like, that represent the instruction. Front-end logic 1006 also includes register renaming logic 1010 and scheduling logic 1012, which may allocate resources and queue the micro operation.

Processor 1000 is shown including execution logic 1014 having a set of execution units 1016-1 through 1016-N. At least one embodiment includes a number of execution units dedicated to specific functions or sets of functions. At least one embodiment includes only one execution unit or one execution unit that can perform a particular function. Execution logic 1014 executes the micro operation.

After completion of execution of the micro operations, back-end logic 1018 retires the instructions of code 1004. In one embodiment, processor 1000 allows out of order execution but enforces in order retirement of instructions. Retirement logic 1020 may take a variety of forms (e.g., re-order buffers or the like). In this manner, processor 1000 is transformed during execution of code 1004, at least in terms of the output generated by the decoder, hardware registers, and tables utilized by register renaming logic 1010, and any registers (not shown) modified by execution logic 1014.

Although not illustrated in FIG. 10, a processing element may include other elements on a chip with processor 1000. For example, a processing element may include memory control logic along with processor 1000. The processing element may include I/O control logic and/or may include I/O control logic integrated with memory control logic. The processing element may also include one or more caches.

FIG. 11 illustrates a computing system 1100 that is arranged in a point-to-point (PtP) configuration according to an embodiment. In particular, FIG. 11 shows a system where processors, memory, and input/output devices are interconnected by a number of point-to-point interfaces.

As illustrated in FIG. 11, system 1100 may include several processors, of which only two, processors 1102 and 1104, are shown for clarity. Processors 1102 and 1104 may each include a set of cores 1103 and 1105, which may execute multiple processes of a program. Processors 1102 and 1104 may also each include integrated memory controller logic (MC) 1106 and 1108 to communicate with memories 1110 and 1112, respectively. The memories 1110 and/or 1112 may store various data such as those discussed with reference to memory 1112. In at least one embodiment, memory controller logic 1106 and 1108 is discrete logic separate from processors 1102 and 1104.

Processors 1102 and 1104 may be any type of a processor. Processors 1102 and 1104 may exchange data via a point-to-point (PtP) interface 1114 using point-to-point interface circuits 1116 and 1118, respectively. Processors 1102 and 1104 may each exchange data with a chipset 1120 via individual point-to-point interfaces 1122 and 1124 using point-to-point interface circuits 1126, 1128, 1130, and 1132. Chipset 1120 may exchange data with a high-performance graphics circuit 1134 via a high-performance graphics interface 1136, using an interface circuit 1137, which could be a PtP interface circuit. In at least one embodiment, any or all of the PtP links illustrated in FIG. 11 could be implemented as a multi-drop bus rather than a PtP link.

At least one embodiment, as disclosed herein, is provided within the processors 1102 and 1104. At least one embodiment, however, exists in other circuits, logic units, or devices within the system 1100 of FIG. 11. Furthermore, at least one embodiment is distributed throughout several circuits, logic units, or devices illustrated in FIG. 11.

Chipset 1120 may be in communication with a bus 1140 via an interface circuit 1141. Bus 1140 may have one or more devices that communicate over it, such as a bus bridge 1142 and I/O devices 1143. Via a bus 1144, bus bridge 1143 may be in communication with other devices such as a keyboard/mouse 1145 (or other input device such as a touch screen, for example), communication devices 1146 (such as modems, network interface devices, or other types of communication devices that may communicate through a computer network), audio I/O device 1147, a data storage device 1148, and/or the like. Data storage device 1148 may store code 1149 that may be executed by processors 1102 and/or 1104. In at least one embodiment, at least a portion of the bus architectures is implemented with one or more PtP links.

The computer systems depicted in FIGS. 10 and 11 are schematic illustrations of embodiments of computing systems that may be utilized in accordance with various embodiments. It will be appreciated that various components of the systems depicted in FIGS. 10 and 11 may be combined in a system-on-a-chip (SoC) architecture or in any other suitable configuration. For example, at least one embodiment disclosed herein can be incorporated into systems such as, for example, mobile devices such as smart cellular telephones, tablet computers, ultrabook computers personal digital assistants, portable gaming devices, etc. It will be appreciated that these mobile devices may be provided with SoC architectures in at least some embodiments.

Note that in at least one embodiment, at least one operation, activity, function, etc. outlined herein may be implemented by logic encoded in one or more tangible media (e.g., embedded logic provided in an application specific integrated circuit (ASIC), digital signal processor (DSP) instructions, software (potentially inclusive of object code and source code) to be executed by a processor, or other similar machine, etc.). In at least one embodiment, the logic may be computer program instructions, such as code 1004 of FIG. 10. In at least one embodiment, a memory element can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In at least one embodiment, the processor transforms an element or an article (e.g., data) from one state or thing to another state or thing by way of the instructions. In another example, the activities outlined herein may be implemented with fixed logic or programmable logic (e.g., software/computer instructions executed by a processor) and the elements identified herein could be some type of a programmable processor, programmable digital logic (e.g., FPGA, EPROM, EEPROM) or an ASIC that includes digital logic, software, code, electronic instructions, or any suitable combination thereof.

At least one embodiment includes software in order to achieve the activities outlined herein. A security module, for example security module 204 of FIG. 2A, can include memory elements for storing information to be used in achieving the security activities, as discussed herein. Additionally, the security module may include a processor that can execute software to perform the activities, as disclosed herein. These devices may further keep information in any suitable memory element (random access memory (RAM), ROM, EPROM, EEPROM, ASIC, etc.), software, hardware, or in any other suitable component, device, element, or object where appropriate and based on particular needs. Additionally, or alternatively, the security module can be software, hardware, firmware or a combination thereof. Any of the memory items discussed herein (e.g., databases, tables, trees, caches, etc.) should be construed as being encompassed within the broad term 'memory element.' Similarly, any of the potential processing elements, modules, and machines described in this Specification should be construed as being encompassed within the broad term 'processor.'

Note that with the example provided above, as well as numerous other examples provided herein, interaction might be described in terms of two, three, or four elements. However, this has been done for purposes of clarity and example only. In certain cases, it may be easier to describe one or more of the functionalities of a given set of flows by only referencing a limited number of elements. It should be appreciated that the components, modules, and/or the like (and their teachings) are readily scalable and can accommodate a large number of components, as well as more complicated/sophisticated arrangements and configurations. Accordingly, the examples provided should not limit the scope or inhibit the broad teachings of the security module and extraction module as potentially applied to a myriad of other architectures.

It is also important to note that the operations in the preceding flow diagrams illustrate only some of the possible scenarios and patterns that may be executed in association with causing an operation to be performed in relation to a security exception. Some of these operations may be deleted or removed where appropriate, or may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. A security module may provide substantial flexibility in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure.

Other Notes and Examples

Example 1 is an apparatus comprising at least one processor; and at least one memory, the at least one memory comprising instructions that when executed by the processor, cause the apparatus to perform, at least, the following: receive, at a security module, policy information associated with at least one security exception, the security exception relating to execution of at least one program; determine, at a security module, an operation associated with the security exception based, at least in part, on the policy information; and cause, by a security module, the operation to be performed, based at least in part, on determination that the at least one security exception occurred.

In example 2, regarding the subject matter of example 1, causation of the operation to be performed, based, at least in part, on determination that the at least one security exception occurred comprises sending, to the at least one program, a directive instructing the program to perform the operation based, at least in part, on occurrence of the at least one security exception.

In example 3, regarding the subject matter of examples 1-2, determination that the at least one security exception occurred comprises receiving an indication, from an exception handler, that the at least one security exception occurred.

In example 4, regarding the subject matter of examples 1-3, the at least one memory further comprises instructions to send a directive to provide an indication that the at least one security exception occurred in relation to occurrence of the security exception.

In example 5, regarding the subject matter of examples 1-4, the operation relates to at least one of termination of a program that caused the exception, sending of an indication of the exception to the program that caused the exception, termination of propagation of the exception, sending information associated with the security exception to a server, causing modification of, at least a portion of, the policy information.

In example 6, regarding the subject matter of examples 1-5, the at least one memory further comprises instructions to determine, at a security module, that the security exception should be monitored based, at least in part, on the policy information, and cause, by a security module, monitoring for the security exception based, at least in part, on the determination that the security exception should be monitored.

In example 7, regarding the subject matter of examples 1-6, the policy information comprises at least one of: program independent policy information, or program dependent policy information.

In example 8, regarding the subject matter of examples 1-7, the policy information comprises information indicative of a level of risk associated with the at least one program.

In example 9, regarding the subject matter of examples 1-8, the at least one memory further comprises instructions to identify, by a security module, at least one program associated with causing occurrence of the at least one security exception, wherein determination of the operation is further based, at least in part, on the identification.

In example 10, regarding the subject matter of examples 1-9, the policy information comprises program independent poky information and program dependent policy information, the program dependent policy information being associated with the at least one program, and wherein the at least one memory further comprises instructions to determine, at a security module, that the security exception should be monitored, based, at least in part, on the program independent policy information and the program dependent policy information, and send, from a security module, a directive to an exception handler to provide the indication, wherein determination that the at least one security exception occurred comprises receiving an indication, from the exception handler, that the at least one security exception occurred.

Example 11 is at least one computer readable storage medium comprising instructions that, when executed, cause an apparatus to receive poky information associated with at least one security exception, the security exception relating to execution of at least one program, determine an operation associated with the security exception based, at least in part, on the policy information, and cause the operation to be performed, based at least in part, on determination that the at least one security exception occurred.

In example 12, regarding the subject matter of example 11, causation of the operation to be performed, based, at least in part, on the determination that the at least one security exception occurred comprises sending, to the at least one program, a directive instructing the program to perform the operation based, at least in part, on occurrence of the at least one security exception.

In example 13, regarding the subject matter of examples 11-12, the instructions further cause the apparatus to determine that the security exception should be monitored based, at least in part, on the policy information, and cause monitoring for the security exception based, at least in part, on the determination that the security exception should be monitored.

In example 14, regarding the subject matter of examples 11-13, the instructions further cause the apparatus to identify at least one program associated with causing occurrence of the at least one security exception, wherein the determination of the operation is further based, at least in part, on the identification.

In example 15, regarding the subject matter of examples 11-14, the policy information comprises program independent policy information and program dependent policy information, the program dependent policy information being associated with the at least one program, and wherein the instructions further cause the apparatus to determine that the security exception should be monitored, based, at least in part, on the program independent policy information and the program dependent policy information, and send a directive to an exception handler to provide the indication, wherein the determination that the at least one security exception occurred comprises receiving an indication, from the exception handler, that the at least one security exception occurred.

Example 16 is a method for providing apparatus security, comprising receiving policy information associated with at least one security exception, the security exception relating to execution of at least one program, determining an operation associated with the security exception based, at least in part, on the policy information, and causing the operation to be performed, based at least in part, on determination that the at least one security exception occurred.

In example 17, regarding the subject matter of example 16, causing the operation to be performed, based, at least in part, on determination that the at least one security exception occurred comprises sending, to the at least one program, a directive instructing the program to perform the operation based, at least in part, on occurrence of the at least one security exception.

In example 18, regarding the subject matter of examples 16-17, determination that the at least one security exception occurred comprises receiving an indication that the at least one security exception occurred.

In example 19, regarding the subject matter of examples 16-18, further comprising sending a directive to provide an indication that the at least one security exception occurred in relation to occurrence of the security exception.

In example 20, regarding the subject matter of examples 16-19, the operation relates to at least one of, termination of a program that caused the exception, sending of an indication of the exception to the program that caused the exception, termination of propagation of the exception, sending information associated with the security exception to a server, causing modification of, at least a portion of, the policy information.

In example 21, regarding the subject matter of examples 16-20, further comprising determining that the security exception should be monitored based, at least in part, on the policy information, and causing monitoring for the security exception based, at least in part, on the determination that the security exception should be monitored.

In example 22, regarding the subject matter of examples 16-21, the policy information comprises at least one of: program independent policy information, or program dependent policy information.

In example 23, regarding the subject matter of examples 16-22, the policy information comprises information indicative of a level of risk associated with the at least one program.

In example 24, regarding the subject matter of examples 16-23, further comprising identifying at least one program associated with causing occurrence of the at least one security exception, wherein determination of the operation is further based, at least in part, on the identification.

In example 25, regarding the subject matter of examples 16-24, the policy information comprises program independent policy information and program dependent policy information, the program dependent policy information being associated with the at least one program, and further comprising determining that the security exception should be monitored, based, at least in part, on the program independent policy information and the program dependent policy information, and sending a directive to an exception handler to provide the indication, wherein determination that the at least one security exception occurred comprises receiving an indication, from the exception handler, that the at least one security exception occurred.

Example 26 is an apparatus comprising means for performing the method of any of examples 16-25.

In example 27, regarding the subject matter of example 26, the means for performing the method comprise a processor and a memory.

In example 28, regarding the subject matter of example 27, the memory comprises machine-readable instructions, that when executed cause the apparatus to perform the method of any of examples 16-25.

In example 29, regarding the subject matter of examples 140 and 16-25, the apparatus is a computing system.

Example 30 is at least one computer readable medium comprising instructions that, when executed, implement a method as described in examples 16-25 or realize an apparatus as described in examples 1-10 and 16-25.

Example 31 is an apparatus for providing apparatus security, comprising means for receiving policy information associated with at least one security exception, the security exception relating to execution of at least one program, means for determining an operation associated with the security exception based, at least in part, on the policy information, and means for causing the operation to be performed, based at least in part, on determination that the at least one security exception occurred.

In example 32, regarding the subject matter of example 31, causing the operation to be performed, based, at least in part, on determination that the at least one security exception occurred comprises sending, to the at least one program, a directive instructing the program to perform the operation based, at least in part, on occurrence of the at least one security exception.

In example 33, regarding the subject matter of examples 31-32, determination that the at least one security exception occurred comprises receiving an indication that the at least one security exception occurred.

In example 34, regarding the subject matter of examples 31-33, further comprising means for sending a directive to provide an indication that the at least one security exception occurred in relation to occurrence of the security exception.

In example 35, regarding the subject matter of examples 31-34, the operation relates to at least one of, termination of a program that caused the exception, sending of an indication of the exception to the program that caused the exception, termination of propagation of the exception, sending information associated with the security exception to a server, causing modification of, at least a portion of, the policy information.

In example 36, regarding the subject matter of examples 31-35, further comprising means for determining that the security exception should be monitored based, at least in part, on the policy information, and means for causing monitoring for the security exception based, at least in part, on the determination that the security exception should be monitored.

In example 37, regarding the subject matter of examples 31-36, the policy information comprises at least one of: program independent policy information, or program dependent policy information.

In example 38, regarding the subject matter of examples 31-37, the policy information comprises information indicative of a level of risk associated with the at least one program.

In example 39, regarding the subject matter of examples 31-38, further comprising means for identifying at least one program associated with causing occurrence of the at least one security exception, wherein determination of the operation is further based, at least in part, on the identification.

In example 40, regarding the subject matter of examples 31-39, the policy information comprises program independent policy information and program dependent policy information, the program dependent policy information being associated with the at least one program, and further comprising means for determining that the security exception should be monitored, based, at least in part, on the program independent policy information and the program dependent policy information, and means for sending a directive to an exception handler to provide the indication, wherein determination that the at least one security exception occurred comprises receiving an indication, from the exception handler, that the at least one security exception occurred.

What is claimed is:

1. An apparatus comprising:
   at least one processor; and
   at least one memory, the at least one memory comprising instructions that when executed by the at least one processor, cause the apparatus to perform, at least, the following:
   receive, at a security module, policy information associated with at least one security exception, wherein the policy information includes program dependent policy information associated with a program and based, at least in part, on one or more operational characteristics of the program, one of the operational characteristics including one of a number of external interfaces of the program, accessibility of code paths to manipulation by data passed through one or more of the external interfaces, a quality of code in the program, or a performance sensitivity of the program, and wherein the policy information comprises information indicative of a level of risk associated with the program;
   determine that the at least one security exception should be monitored based, at least in part, on the program dependent policy information;
   send a directive to an exception handler to provide an indication if the at least one security exception occurs;
   receive the indication, from the exception handler, that the at least one security exception occurred;
   determine, at the security module, an operation associated with the at least one security exception and based, at least in part, on the policy information; and cause, by the security module, the operation to be performed, based at least in part, on a determination that the at least one security exception occurred.

2. The apparatus of claim 1, wherein causation of the operation to be performed, based, at least in part, on determination that the at least one security exception occurred comprises sending, to the program, a directive instructing the program to perform the operation based, at least in part, on occurrence of the at least one security exception.

3. The apparatus of claim 1, wherein the operation relates to at least one of, termination of the program, sending of an indication of the exception to the program, termination of propagation of the exception, sending information associated with the at least one security exception to a server, causing modification of, at least a portion of, the policy information.

4. The apparatus of claim 1, wherein the policy information comprises program independent policy information.

5. The apparatus of claim 1, wherein the at least one memory further comprises instructions to identify, by the security module, the program associated with causing occurrence of the at least one security exception, wherein determination of the operation is further based, at least in part, on the identification.

6. The apparatus of claim 1, wherein the policy information comprises program independent policy information, wherein the determination
   that the at least one security exception should be monitored is based, in part, on the program independent policy information.

7. The apparatus of claim 1, wherein the policy information includes other program dependent policy information associated with one or more other programs, wherein the at least one memory further comprises instructions to:
   determine that the at least one security exception should be monitored based, in part, on the other program dependent policy information.

8. The apparatus of claim 4, wherein the program independent policy information further includes one or both of information relating to an operating environment of the apparatus and general information regarding security exceptions.

9. The apparatus of claim 1, wherein the exception handler sends the indication in response to a hardware detection of the at least one security exception.

10. At least one non-transitory computer readable storage medium comprising instructions that, when executed, cause an apparatus to:
   receive policy information associated with at least one security exception, wherein the policy information includes program dependent policy information associated with a program and based, at least in part, on one or more operational characteristics of the program, one of the operational characteristics including a number of external interfaces of the program, accessibility of code paths to manipulation by data passed through one or more of the external interfaces, a quality of code in the program, or a performance sensitivity of the program, and wherein the policy information comprises information indicative of a level of risk associated with the program;
   determine that the at least one security exception should be monitored based, at least in part, on the program dependent policy information;
   send a directive to an exception handler to provide an indication if the at least one security exception occurs;
   receive the indication, from the exception handler, that the at least one security exception occurred;
   determine an operation associated with the at least one security exception and based, at least in part, on the policy information; and
   cause the operation to be performed, based at least in part, on a determination that the at least one security exception occurred.

11. The at least one non-transitory medium of claim 10, wherein causation of the operation to be performed, based, at least in part, on the determination that the at least one security exception occurred comprises sending, to the program, a directive instructing the program to perform the operation based, at least in part, on occurrence of the at least one security exception.

12. The at least one non-transitory medium of claim 10, wherein the instructions further cause the apparatus to identify the program associated with causing occurrence of the at least one security exception, wherein the determination of the operation is further based, at least in part, on the identification.

13. The at least one non-transitory medium of claim 10, wherein the policy information comprises program independent policy information, wherein the determination
   that the at least one security exception should be monitored is based, in part, on the program independent policy information.

14. The at least one non-transitory medium of claim 10, wherein the policy information includes other program dependent policy information associated with one or more other programs, wherein the instructions further cause the apparatus to:
   determine that at least one other security exception should be monitored based, at least in part, on the other program dependent policy information.

15. The at least one non-transitory medium of claim 10, wherein the program dependent policy information further includes an identity of a source of the program.

16. The at least one non-transitory medium of claim 10, wherein the operation relates to at least one of, termination of the program, sending of an indication of the exception to the program, termination of propagation of the exception, sending information associated with the at least one security exception to a server, causing modification of, at least a portion of, the policy information.

17. The at least one non-transitory medium of claim 10, wherein the exception handler sends the indication in response to a hardware detection of the at least one security exception.

18. The at least one non-transitory medium of claim 17, wherein the at least one security exception detected by hardware includes at least one of an out of bounds memory access, an attempt to execute an instruction stored in a memory region designated for non-executable information, or the program performing operations that exceed a privilege level associated with the program.

19. A method for providing apparatus security, comprising:
   receiving policy information associated with at least one security exception, wherein the policy information includes program dependent policy information associated with a program and based, at least in part, on one or more operational characteristics of the program, one of the operational characteristics including a number of external interfaces of the program, accessibility of code paths to manipulation by data passed through one or more of the external interfaces, a quality of code in the program, or a performance sensitivity of the program, and wherein the policy information comprises information indicative of a level of risk associated with the program;

determining that the at least one security exception should be monitored based, at least in part, on the program dependent policy information;

sending a directive to an exception handler to provide an indication if the at least one security exception occurs;

receiving the indication, from the exception handler, that the at least one security exception occurred;

determining, by one or more hardware processors, an operation associated with the at least one security exception and based, at least in part, on the policy information; and causing, by the one or more hardware processors, the operation to be performed, based at least in part, on a determination that the at least one security exception occurred.

20. The method of claim 19, wherein causing the operation to be performed, based, at least in part, on the determination that the at least one security exception occurred comprises sending, to the program, a directive instructing the program to perform the operation based, at least in part, on occurrence of the at least one security exception.

21. The method of claim 19, wherein the operation relates to at least one of, termination of the program, sending of an indication of the exception to the program, termination of propagation of the exception, sending information associated with the at least one security exception to a server, causing modification of, at least a portion of, the policy information.

22. The method of claim 19, wherein the policy information comprises program independent policy information.

23. The method of claim 19, further comprising identifying at least one program associated with causing occurrence of the at least one security exception, wherein determination of the operation is further based, at least in part, on the identification.

24. The method of any of claim 19, wherein the policy information comprises program independent policy information, wherein the determination
that the at least one security exception should be monitored is based, at least in part, on the program independent policy information.

25. The method of claim 19, wherein the policy information includes other program dependent policy information associated with one or more other programs, the method further comprising:
determining that the at least one security exception should be monitored based, in part, on the other program dependent policy information.

* * * * *